United States Patent
Vukich

[15] 3,684,233
[45] Aug. 15, 1972

[54] LEVELING DEVICE
[72] Inventor: Franklin J. Vukich, New Castle, Pa.
[73] Assignee: Lockley Manufacturing Co., Inc., New Castle, Pa.
[22] Filed: Nov. 13, 1970
[21] Appl. No.: 89,255

[52] U.S. Cl. .................248/352, 254/94, 248/188.2
[51] Int. Cl. ............................................F16m 13/00
[58] Field of Search ..248/352, 188.2, 188.3; 254/88, 254/94

[56] References Cited

UNITED STATES PATENTS

| | | | |
|---|---|---|---|
| 1,947,346 | 2/1934 | Lintern | 254/94 |
| 1,915,320 | 6/1933 | Jones | 248/188.2 |

FOREIGN PATENTS OR APPLICATIONS

| | | | |
|---|---|---|---|
| 18,601 | 1912 | Great Britain | 254/94 |

*Primary Examiner*—Chancellor E. Harris
*Attorney*—Yount & Tarolli

[57] ABSTRACT

A leveling device supports a portion of a vehicle in a level position when the vehicle is on irregular terrain. The leveling device includes a wheel-receiving surface upon which one of the wheels of the vehicle may be moved. The leveling device also includes a terrain-engaging surface which is curvilinear in configuration, converges toward the wheel-receiving surface and extends at an acute angle with respect to the terrain-engaging surface. A wheel of the vehicle is moved onto the wheel-receiving surface at the narrow end of the leveling device. As the wheel moves along the wheel-receiving surface and the terrain-engaging surface engages the irregular terrain, the device rocks on the terrain. Consequently, the wheel of the vehicle is raised or lowered and thereby the vehicle is leveled.

4 Claims, 4 Drawing Figures

PATENTED AUG 15 1972 3,684,233

INVENTOR
FRANKLIN J. VUKICH

BY Yount and Tarolli
ATTORNEYS 3,684,233

LEVELING DEVICE

The present invention relates to a leveling device and, more particularly, relates to a leveling device for supporting a portion of a vehicle in a level position.

Known leveling devices include an assorted type of lifting devices, such as jacks. These leveling devices are utilized to assure a suitable level condition of a vehicle during stationary use thereof. For example, when a house vehicle, such as a camper or house trailer, is driven into camp grounds where the occupants will temporarily dwell, it is desirable to provide a device which will level the vehicle quickly with a minimum of effort and time. When the vehicle is so leveled, it is then possible for the occupants thereof to conduct their normal everyday living activities, such as cooking, eating, sleeping, in a normal manner in a vehicle which is in a level position.

The prior art devices have in some cases been incorporated in the vehicle and others utilized as separate devices to lift and support the vehicle in a level position. These leveling mechanisms of the prior art include hydraulic jacks or mechanical devices, such as a threaded jack. The parts for such devices are manufactured at a significant cost and require a costly assembly process associated therewith which further increase the cost of the device. In addition, these devices of the prior art in many cases require physical effort to lift the vehicle to the desired level condition which is burdensome to the person who is adjusting the level of the vehicle. In addition, the prior art devices do not provide for stable support of the vehicle when the vehicle is on extremely rough terrain.

The immediate invention solves these problems of the prior art devices by providing a leveling device which quickly and efficiently allows the leveling of a vehicle without requiring any physical effort on the part of the person who is leveling the vehicle.

The immediate invention is a leveling device for supporting a portion of a vehicle in a level position when the vehicle is on irregular terrain. The leveling device of the present invention comprises a generally wedge-shaped member having a wheel-receiving surface and a terrain-engaging surface. The terrain-engaging surface is curvilinear in shape and converges toward and at an acute angle to the wheel-receiving surface at a narrow end of the wedge-shaped member. To effect vehicle leveling, a wheel of the vehicle is moved onto the wheel-receiving surface at the narrow end of the wedge-shaped member, with the terrain-engaging surface on the ground. As the wheel moves across the wheel-receiving surface, the member rocks on the ground and, since the wheel-receiving surface and terrain-engaging surface diverge from each other, the vehicle is raised to a desired position or until it is level.

The present invention is significantly advantageous, since no physical effort is required to raise or lower the vehicle, but rather the motor vehicle which moves the vehicle is used to exert effort thereon. In addition, the present invention provides a leveling device which is simple and uncomplicated and does not require a great number of parts to effect leveling of a vehicle. A further advantage of the present invention is that the rocking motion of the member provides additional stability after the vehicle is leveled on irregular terrain and thereby provides a safer leveling of the vehicle.

Accordingly, it is an object of the present invention to provide a new and improved leveling device for supporting a portion of the vehicle in a level position when the vehicle is on irregular terrain and having a simple and uncomplicated design and not requiring physical effort to move the vehicle into the level position.

A further object of the present invention is to provide a new and improved leveling device for supporting in a stable manner a portion of a vehicle in a level position when the vehicle is on irregular terrain.

It is a further object of the present invention to provide a leveling device for supporting a portion of a vehicle when the vehicle is on irregular terrain to effect leveling of the vehicle, which device includes a wheel-receiving surface and a terrain-engaging surface which is generally curvilinear in shape and converges toward the wheel-receiving surface at an acute angle at a narrow end thereof and wherein the device varies the vertical position of the vehicle when a wheel of the vehicle is moved on the wheel-receiving surface.

Further objects, advantages and features of the present invention will be apparent to those skilled in the art to which it relates from the following detailed description made with reference to the accompanying drawings forming a part of this specification and in which.

Figure 1:
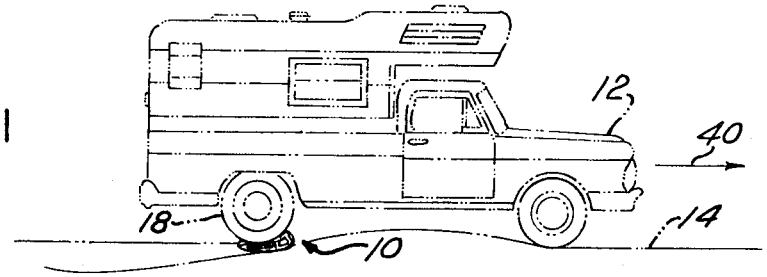
FIG. 1 is a side elevational view of the leveling device of the present invention and of a vehicle which is leveled by the leveling device of the present invention.

The present invention provides a leveling device for supporting a portion of a vehicle to position the vehicle in a level position when the vehicle is on irregular terrain. The leveling device of the present invention assures a suitable level condition of a vehicle during stationary use in a simple and uncomplicated manner. The present invention also provides a leveling device which does not require physical effort to effect leveling of the vehicle and provides a substantially stable mounting for the vehicle after it is leveled and is at rest. The present invention may be applied to leveling devices of a wide variety of constructions and designs, and for purposes of illustration is described in the drawings as applied to a leveling device 10, as shown in FIG. 1.

The leveling device 10 is utilized to support a portion of the vehicle 12 when the vehicle is on irregular terrain 14 to assure a suitable level condition of the vehicle during stationary use thereof. It should be understood that the vehicle 12 may be any vehicle, one such example being a house trailer or the camper shown in FIG. 1. Other examples of vehicles which may be leveled by the present invention are travel trailers, mobile homes, commercial trucks, automobiles, air compressors which are mounted on a trailer, welders mounted on a trailer, and boat trailers. Since these vehicles are often moved from one location to the other, it is essential that the leveler 10 be able to level the vehicle in an efficient quick manner. Also, for safety purposes it is essential that the vehicle be supported on the ground with a high degree of stability after being leveled.

The leveling device 10, in general, comprises a member 22 which is generally wedge-shaped. The member 22 has a narrow end 16 and an upper wheel-engaging surface 24 and a lower ground-engaging surface 26.

Figure 2:
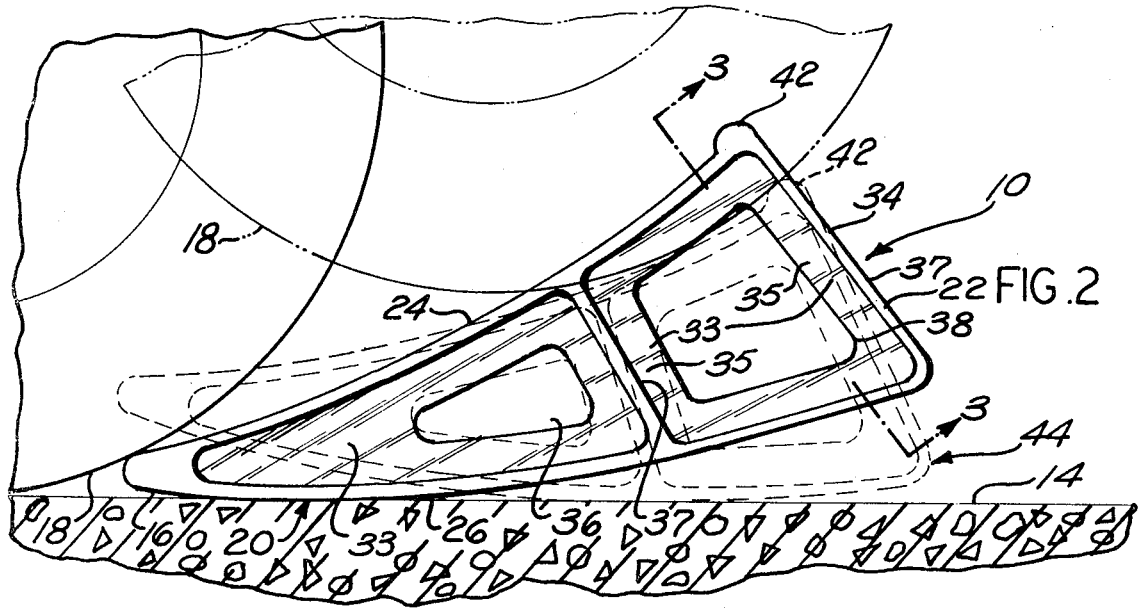
FIG. 2 is an enlarged view of the leveling device and wheel of the vehicle shown in FIG. 1.

In order to utilize the leveling device 10 of the present invention, when the vehicle 12 is located on the terrain upon which it is to be stationarily positioned, the narrow end 16 of the leveling device, as seen in FIG. 2, is located in an initial position adjacent the wheel 18 of the vehicle 12. Such a position of the leveling device 10 is indicated in solid lines at 20 in FIG. 2 wherein the device is wedged under the wheel 18. In the position 20, the member 22 of the leveling device 10 has its wheel-receiving surface 24 positioned to receive the wheel 18, and its ground-engaging surface 26 is in contact with the irregular terrain 14.

The terrain-engaging surface 26 is generally curvilinear in shape and converges toward the wheel-receiving surface 24 at the narrow end 16 of the member 22. It should be noted that the wheel-engaging surface 24 is also generally curvilinear in configuration, but may not have a radius smaller than the radius of the wheel 18. When the surface 24 has a curvature thereon which is greater than the curvature of the wheel 18, the wheel 18, when moved therealong, is supported by the member 22 with great stability.

When the member 22 is in position 20, the vehicle 12 is driven forward so that the wheel 18 on the side which is to be leveled is moved onto and along the wheel-engaging surface 24. In order to support the wheel 18 of the vehicle 12 and the weight associated therewith, the wheel-engaging surface 24 of the member 22 comprises the upper surface of a flange portion 28 of the member 22. The flange portion 28 also has a lower surface 30. The terrain-engaging surface 26 comprises the lower surface of a flange portion 32 of the member 22. The flange portions 28, 32 are interconnected by centrally located webs 33 at the narrow end 16 thereof and wide end 34 thereof. A middle web portion, generally indicated at 35, is located between webs 33 and also interconnects portions 28, 32.

The centrally located web portion 33 at the wide end 34 is connected to laterally extending web portions 37. Laterally extending webs 37 also extend in opposite directions from the middle web portion 35. These laterally extending webs 37 provide stability and rigidity to the member 22 so that the weight of the vehicle 12 is safely supported thereby.

Openings 36, 38 are provided between the interconnecting webs 33 and 35 and, as such, allow the member 22 to have a minimum weight while maintaining structural rigidity thereof so that the wheel 18 of the vehicle 12 may be supported thereby in any position. In addition, the surfaces 24, 26 are sufficiently wide to provide a stable leveling device which prevents the vehicle from being moved after it is positioned and the wheels locked in a suitably level condition for stationary use.

It is important for the surfaces 24, 26 to be at an acute angle with respect to each other so that the wheel 18 of vehicle 12 may be readily moved onto the wheel-receiving surface 24. When the vehicle 12 is moved forward, in a direction generally indicated at 40 in FIG. 1, the wheel 18 moves along the wheel-engaging surface 24. Since the surfaces 24, 26 diverge from the narrow end 16 to the wide end 34, the farther the wheel 18 is moved along the surface 24 to the end 34, the higher it will be lifted from the terrain 14.

Figure 3:
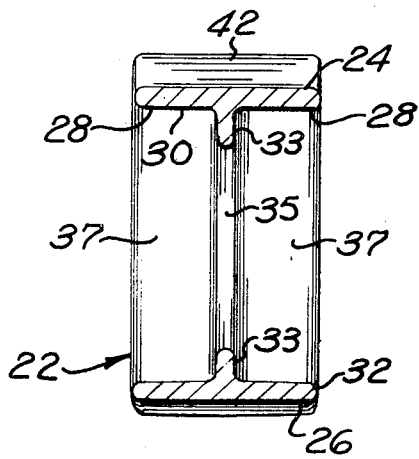
FIG. 3 is a cross-sectional view of the leveling device, as shown in FIG. 2 and taken along line 3—3 thereof.

The wheel 18 may be moved along the surface 24 until the desired level condition is attained. A visual aid is provided in the form of an extension 42 on the member 22 and which indicates the maximum position of the device. The extension 42 may extend across the entire surface 24, as shown in FIG. 3. The maximum or limit position of the member 22 is indicated in dotted lines at 44 in FIG. 2. While the member 22 is moved between the two limit positions 20, 44, it should be apparent that the member 22 rocks on the terrain 14 with the terrain-engaging surface 26 in contact therewith.

The rocking motion of the member 22 provides stability so that if the vehicle 12 is stopped at any intermediate position between the positions 20, 44, it will be supported in a stable manner. When a suitably level position is attained, the brakes may be locked on the vehicle or movement of the vehicle 12 with respect to the ground 12 restrained in some manner.

Figure 4:
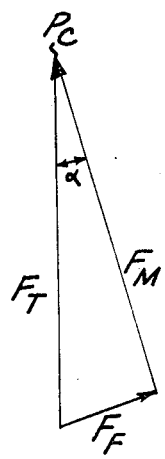
FIG. 4 is a force polygon showing a force analysis of the leveling device of the present invention.

Since the curvatures of the surfaces 24, 26 are in the same direction, stability of the vehicle 14 when in the leveled position is provided. The wheel 18 will not tend to move as readily along such a curved surface 24 as it would if the surface 24 had not curvature. The curvature of the terrain-engaging surface 25 increases the stability of the vehicle 12 when supported by the member 22 in a substantially level position in the following manner: Since the weight of the vehicle supported by the wheel 18 acts in a vertical direction, an equal and opposite force ($F_t$) must be exerted on the wheel 18 when supported in a level position. (See FIG. 4) When a wheel is supported on an incline, the forces which compose this vertical opposing force are the forces ($F_m$), exerted by the member 22 along a line perpendicular to the surface 24 and passing through the point of contact ($P_c$) between the wheel 18 and the member 22, and the frictional force ($F_f$) between the wheel 18 and member 22 (as seen in the force polygon of FIG. 4). Obviously, when the angle alpha between lines of action of the forces $F_m$ and $F_f$ increases, a greater frictional force $F_f$ is required, as seen in the force polygon of FIG. 4.

As the frictional force $F_f$ increases, there is an increasing possibility of the wheel 18 sliding down the surface 24 when in a position in which it is supported by the member 22. This tendency to slide down the surface 24 produces an unstable and unsafe condition where the vehicle may suddenly slide from a level position to an unlevel position. An unstable condition also could occur due to sliding of the member 22 along the ground.

By providing a curved surface 26, this stability problem is solved. Since the member 22 rocks on the surface 26 as the wheel 18 moves along the surface 24, the contact $P_c$ between the wheel and the surface 24 and the contact between the ground and the ground-engaging surface 26 tend to always lie in a perpendicular plane, and thus the angle alpha is maintained at a minimum so that the frictional force $F_f$ required to stop the wheel from sliding relative to the surface 24 is minimized and thereby increases the force ($F_m$) provided by the member 22 and produces a more stable condition. This also minimizes the tendency of the member 22 to slide along the ground.

In order to provide a still further stable condition, the surface 24 is curved in a similar direction as the surface 26 to further decrease the angle alpha and, consequently, the frictional force $F_f$ required. By the compound curving of the surfaces 24, 26, the stability of the wheel 18 with respect to the member 22 is further maximized. The curvature of the surfaces 24, 26 should be generated so as to minimize the frictional force $F_f$.

It should be understood that the surfaces 24, 26 may be provided with frictional finishes to increase the friction of bodies in contact with them, and that the surface 24 may be straight but is preferably curvilinear so that the advantages of the compound curves of both of the surfaces 24, 26 may be realized so that the wheel 18 of the vehicle 12 is supported in a more vertical direction.

Thus, it can be seen that the leveling device of the present invention provides a device for supporting a portion of the vehicle in a level position when the vehicle 12 is on irregular terrain. The leveling device 10 includes a wheel-engaging surface 24 and a terrain-engaging surface 26 which are generally curvilinear in configuration and converge toward each other at one end and diverge from each other at the other end so that a narrow and a wide end 22, 34, respectively, are provided. Due to the curvilinear surfaces 24, 26, the wheel 18 of the vehicle 12 supported by the leveling device 10 is in a relatively stable position as it is moved along the wheel-engaging surface 24 and may be stopped at any position therealong when the vehicle has arrived at a suitably level condition. The leveling device 10 of the present invention is also uncomplicated and simple and does not require a number of parts which can be damaged to render the device 10 inoperative. The leveling device of the present invention does not require any physical effort to be exerted by the person leveling the vehicle, rather the person who is leveling the vehicle may use the drive mechanism for moving the vehicle from one position to another instead of exerting physical effort to level the vehicle 12.

What is claimed is:

1. A leveling device for raising a wheel of a vehicle when the vehicle is on irregular terrain to effect leveling of the vehicle, said device comprising a first structural part providing a wheel-receiving surface along which the wheel of the vehicle rolls, said wheel-receiving surface including a first area which initially engages the wheel and a second area spaced from the first area and which second area engages the wheel due to rolling thereof along the wheel-receiving surface from the first area, said wheel-receiving surface being a curved surface having a radius of curvature greater than the radius of the wheel, and means engageable with the terrain for enabling said device to rock relative to the wheel and terrain to a position to effect said leveling in response to rolling of the vehicle wheel along said wheel-receiving surface, said last-mentioned means including a second structural part having a curved terrain-engaging surface engageable with the terrain and which converges toward said wheel-receiving surface and forms an acute angle portion therewith over which the vehicle wheel rolls into engagement with said first area of said wheel-receiving surface to effect the leveling, said terrain-engaging surface having a radius of curvature greater than the radius of the wheel and greater than the radius of the wheel-receiving surface whereby any force tending to cause sliding of the device on the terrain relative to the vehicle wheel as the wheel rolls along said wheel-receiving surface is minimized.

2. A leveling device as defined in claim 1 wherein said device is generally wedge-shaped and has a wide end portion opposite the acute angle portion, and wherein a first structural support portion extends between said first and second structural parts at said wide end.

3. A leveling device as defined in claim 2 wherein said wheel-receiving surface and said terrain-engaging surface have equal widths and said first structural support portion has a width equal to the width of said wheel-receiving and terrain-engaging surfaces, and further including an intermediate support portion having a width equal to the width of said first support portion and located intermediate said acute angle portion and said wide end portion and interconnecting said first and second structural parts.

4. A leveling device as defined in claim 3 wherein a first web portion extends parallel to the extent of said wheel-receiving surface and is located generally centrally thereof and interconnects the central portions of said acute angle portion and said intermediate support portion and the central portions of said first and second structural parts, and a second web portion extends parallel to the extent of said wheel-receiving surface and is located centrally thereof and interconnects the central portions of said first support portion and said intermediate support portion and the central portions of said first and second structural parts.

* * * * *